United States Patent [19]

Wolf et al.

[11] 4,453,042
[45] Jun. 5, 1984

[54] TELEPHONE STATION SIGNALING LOCK CIRCUIT

[75] Inventors: Ann L. Wolf, Pinellas Park; John G. Wagoner, St. Petersburg, both of Fla.

[73] Assignee: GTE Automatic Electric Inc., Northlake, Ill.

[21] Appl. No.: 452,588

[22] Filed: Dec. 23, 1982

[51] Int. Cl.³ .............................................. H04M 1/00
[52] U.S. Cl. .............................. 179/84 VF; 179/90 D; 179/189 D
[58] Field of Search ............. 179/90 B, 90 D, 189 D, 179/18 DA, 84 VF, 81 R; 340/825.31, 825.48, 825.32

[56] References Cited

U.S. PATENT DOCUMENTS 4,232,200 11/1980 Hestad et al. ................ 179/90 B X
4,298,775 11/1981 Buck et al. .................... 179/90 B X

*Primary Examiner*—A. D. Pellinen
*Assistant Examiner*—James L. Dwyer
*Attorney, Agent, or Firm*—Gregory G. Hendricks; Peter Xiarhos

[57] ABSTRACT

A circuit which locks the signaling circuit of a telephone station. A microprocessor disconnects a keypad from an associated tone generator upon detection of operation of a lock button. The microprocessor connects the keypad to the tone generator upon detection of operation of the lock button and a predetermined unlock code provided by the keypad.

12 Claims, 1 Drawing Figure

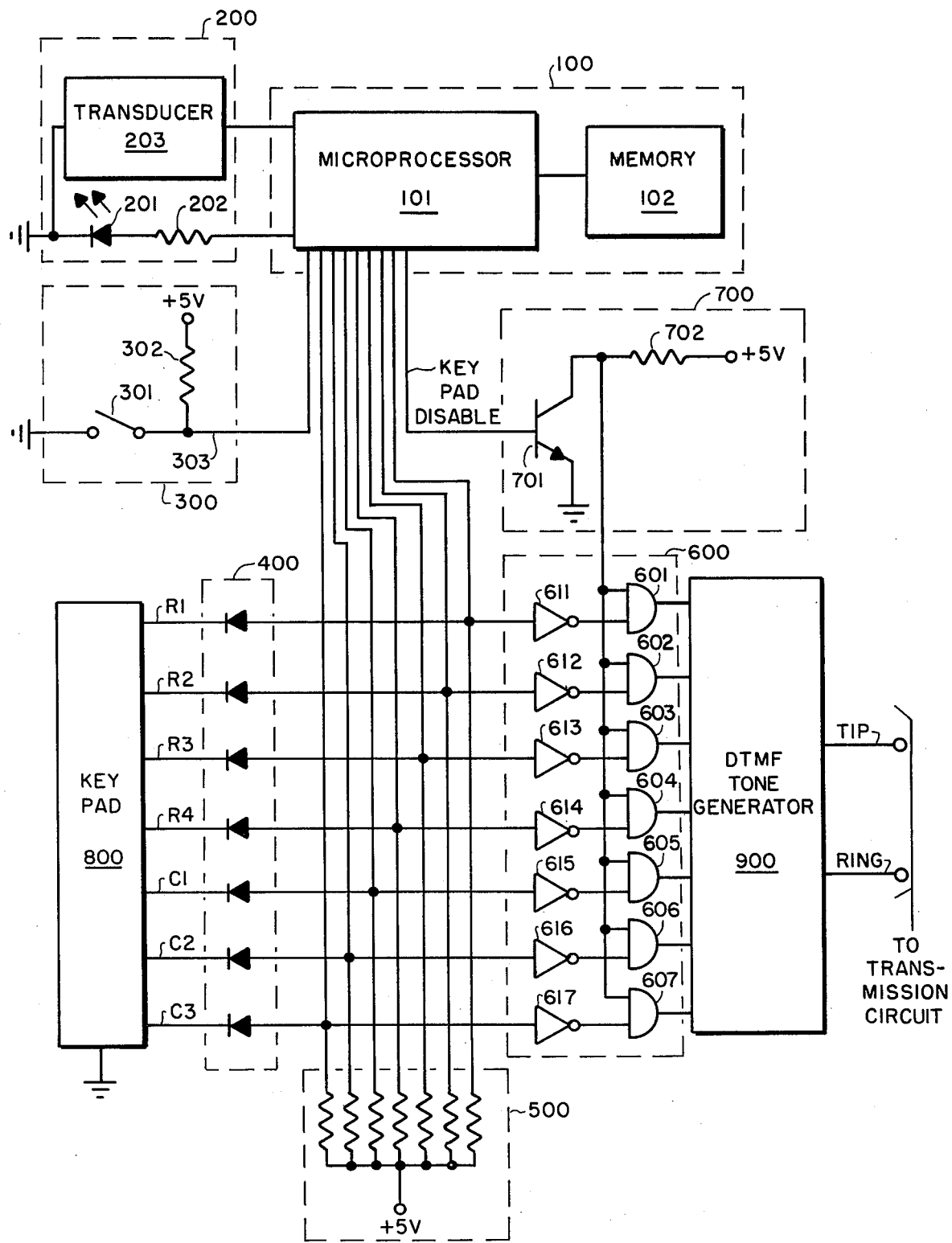

TELEPHONE STATION SIGNALING LOCK CIRCUIT

CROSS-REFERENCE TO RELATED APPLICATION

A copending and concurrently filed U.S. patent application, Ser. No. 452,587, is related to the present invention. That application is titled "Telephone Feature Assignment Circuit". The inventions claimed in both applications were assigned to the same assignee.

FIELD OF THE INVENTION

The present invention relates to a telephone station and more particularly to a circuit for locking the signaling circuit of a telephone station.

BACKGROUND OF THE INVENTION

The signaling circuit of a telephone station has traditionally been locked by a mechanical device. Rotary dial telephones are often locked by connecting a cylinder to a finger hole in the rotary dial. A key is then inserted in the cylinder to unlock and remove the cylinder from the rotary dial. Pushbutton telephones are often locked by connecting a cover over the pushbutton keypad. A key is then inserted in the cover to unlock it and remove it from the keypad.

Computer controlled locking arrangements have also been used. With such an arrangement a computer controlled telephone central office or other switching system uses class of service restrictions to lock the signaling circuit of a connected telephone. Computer controlled restriction arrangements are also used to prevent computer terminals from accessing unauthorized programs and data. Under such an arrangement passwords, access codes or identification numbers are assigned to the terminals of their users and the proper password, access code or identification number must be transmitted to the connected computer before the terminal can access restricted programs or data. However, these computer controlled locking or restriction arrangements require administration of class of service codes, passwords, access codes or identification numbers by a central computer and they do not inhibit operation of the telephone or computer terminal.

The present invention overcomes this requirement through use of a locking circuit located within the telephone station.

SUMMARY OF THE INVENTION

In accordance with the present invention, a telephone station signaling lock circuit is provided for use in a telephone station which includes a keypad being operative to provide a plurality of pairs of row and signals, and a tone generating being operative to provide a plurality of pairs of tones. The signaling lock circuit comprises a station lock switch being operative to provide a switch signal, and a storage circuit being operative to provide a stored lock status signal, a stored unlock status signal and a stored unlock code signal, each in response to a lock status signal, unlock status signal or unlock code signal, respectively, being stored in the storage means.

The station signaling lock circuit also includes a microprocessor connected between the station lock switch and the storage circuit and being operative in response to the switch signal and the stored unlock status signal to provide disable and first sensible control signals and to store a lock status signal in the storage circuit. The microprocessor is further operative in response to the switch signal, the stored lock status signal and a first plurality of pairs of row and column signals representative of the stored unlock code signal, to provide enable and second sensible control signals, and to store an unlock status signal in the storage circuit.

The station signaling lock circuit also includes a gating circuit coupled between the microprocessor and the tone generator and it is further coupled between the keypad and the tone generator. It is operative in response to the enable signal and the pairs of row and column signals to provide signals representative of the pairs of row and column signals. It is further operative in response to the disable signal to inhibit the signals representative of the row and column signals. The tone generator is operative in response to the signals representative of the pairs of row and column signals to provide an associated pair of tones.

The station signaling lock circuit further includes a first sensible indication circuit connected to the microprocessor and being operative in response to the first sensible control signal to provide a first sensible signal. It is further operative in response to the second sensible control signal to provide a second sensible signal.

DESCRIPTION OF THE DRAWING

The single FIGURE of the accompanying drawing is a schematic diagram of a telephone station signaling lock circuit in accordance with the present invention.

DESCRIPTION OF THE PREFERRED EMBODIMENT

Referring now to the accompanying drawing, the telephone station signaling lock circuit of the present invention is shown. This circuit includes processing unit 100 connected to audible and visual display circuit 200, switch circuit 300, diode network 400, resistor network 500, gating circuit 600 and disable circuit 700. Diode network 400 is further connected to keypad 800, and gating circuit 600 is further connected to Dual Tone Multifrequency (DTMF) tone generator 900. Tone generator 900 is connectable to an associated transmission circuit via the TIP and RING leads.

Processing unit 100 includes microprocessor 101 connected to memory 102. Display circuit 200 includes transducer 203 and light emitting diode 201 which is connected to resistor 202. Switch circuit 300 includes a station lock switch 301, which is connected to ground when an associated station lock pushbutton is depressed. Switch 301 is also connected to a +5 volt supply via resistor 302. This switch is further connected to microprocessor 101 via lead 303. Diode network 400 includes seven protection diodes connected to keypad 800 via four row (R1-R4) and three column (C1-C3) leads. These diodes protect microprocessor 101 from extraneous high voltage signals applied to the row and column leads. Keypad 800 is old and well known and includes four rows and three columns of pushbuttons. Each pushbutton causes its associated row and column leads to be connected to ground when it is operated. DTMF tone generator 900 is also old and well known and is operative to provide a plurality of pairs of tones. Resistor network 500 includes seven resistors connected to the +5 volt supply. Each resistor is further connected to an associated diode in diode network 400. Gating circuit 600 includes seven AND gates, 601–607, connected to DTMF tone generator 900. The first input of each of these gates is connected to disable circuit 700. The second input of each of these gates is connected to an associated inverter in inverter group 611-617. Each inverter is further connected to the junction of an associated diode and resistor in diode and resistor networks 400 and 500, respectively. Disable circuit 700 includes transistor 701 having its base connected to microprocessor 101, via the keypad disable lead, its emitter connected to ground, and its collector connected to the +5 volt supply via resistor 702.

Keypad 800, diode network 400, resistor network 500 and gating circuit 600 operate, in combination, as a signaling circuit.

Under normal conditions, a logic level 0 signal as applied to the keypad disable lead so transistor 701 is turned off. Logic level 1 signals then appear at the first input of AND gates 601-607 via resistor 702 and the +5 volt supply. If none of the pushbuttons in keypad 800 is operated a logic level 1 signal appears at the input of each inverter in inverter group 611-617 via resistor network 500 and the +5 volt supply. Inverters 611-617 then apply logic level 0 signals to the second input of each AND gate in gating circuit 601-607. Each AND gate then applies a logic level 0 signal to DTMF tone generator 900 causing it to prevent tones from being applied to the TIP and RING leads. When a pushbutton is operated ground is connected to an associated one of the row leads (R1-R4) and is associated one of the column leads (C1-C3). The resultant logic level 0 signals are inverted to logic level 1 signals by an associated pair of inverters in inverter group 611-617. A logic level 1 signal then appears at the second input of an associated pair of AND gates in gating circuit 600. Consequently, each of said associated pair of AND gates applies a logic level 1 signal to DTMF tone generator 900. This tone generator then applies a corresponding pair of tones to the TIP and RING leads.

In order to lock the signaling circuit, the station lock pushbutton is momentarily depressed causing switch 301 to close and connect lead 303 to ground. Microprocessor 101 detects the resultant logic level 0 switch signal on lead 303 and applies a logic level 1 first sensible control signal to light emitting diode (LED) 201 causing it to light (first sensible signal). Thus LED 201 provides a steady visual indication that the signaling circuit is locked. Microprocessor 101 also writes a logic level 1 lock status signal into a station lock word in memory 102 (storage means). The contents of this word then provide microprocessor 101 with an internal indication that the signaling circuit is locked. Microprocessor 101 then applies a logic level 1 disable signal to keypad disable lead. This signal then appears at the base of transistor 701, causing it to turn on and apply a logic level 0 signal to the first input of each AND gate in gating circuit 600. Each of these AND gates then applies a logic level 0 signal to DTMF tone generator 900 causing it to prevent application of tones to the TIP and RING leads. Thus, keypad 800 is electrically disconnected from DTMF tone generator 900 and the signaling circuit is effectively locked.

In order to unlock the signaling circuit, the station lock pushbutton is again momentarily depressed. Microprocessor 101 again detects the resultant logic level 0 switch signal and then reads the station lock word of memory 102. Since the signaling circuit is already locked as indicated by a logic level 1 lock status signal stored in the station lock word microprocessor 101 applies a pulsing or periodic logic level 1 first sensible control signal to LED 201 (first sensible indicator), causing it to flash at a rate of 120 interruptions per minute (first predetermined rate). This flashing visual signal is used to prompt transmission of the unlock code to microprocessor 101 via keypad 800. Selected keypad pushbuttons are then successively depressed, causing logic level 0 signals to appear on the associated row (R1-R4) and column (C1-C3) leads. Each pair of row and column signals represents a digit (0-9) or a character (# or *), and the associated pushbuttons are so identified. For example, the digit 2 is represented by logic level 0 signals appearing on the row 1 and column 2 leads. Microprocessor 101 detects the logic level 0 signals associated with each preferred pushbutton and determines the digit or character represented by each such pair of row and column signals. Microprocessor 101 accumulates these digit or character signals and compares the resultant keypad provided unlock code with an unlock code previously stored in memory 102.

If the two codes compare, microprocessor 101 applies a logic level 0 enable signal to the keypad disable lead. This signal then appears at the base of transistor 701, causing it to turn off. A logic level 1 signal is then applied to the first input of each AND gate in gating circuit 600 via the +5 volt supply and resistor 702. This logic level 1 signal enables these AND gates and thereby allows them to apply subsequent row and column signals, as inverted by inverters 611-617, to DTMF tone generator 900. Thus the signals applied to DTMF tone generator 900 are representative of the row and column signals. Microprocessor 101 also applies a logic level 0 second sensible control signal to LED 201, causing it to be extinguished (second sensible signal) and thereby provide an external indication that the signaling circuit is unlocked. Microprocessor 101 then writes a logic level 0 unlock status signal into the station lock word to provide an internal indication that the signaling circuit is unlocked.

If the keypad unlock code and the unlock code stored in memory 102 do not match, microprocessor 101 continues to apply the logic level 1 signal to the keypad disable lead, causing the signaling circuit to remain locked. Under these non-matching conditions, microprocessor 101 applies a pulsing or periodic logic level 1 first sensible control signal to LED 201 causing it to flutter at a rate of 480 interruptions per minute (second predetermined frequency). Microprocessor 101 also applies a logic level 1 third sensible control signal to transducer 203 (second sensible indicator) causing it to produce a continuous audible tone (second sensible signal). The fluttering LED and continuous audible tone provide visual and audible indications that an incorrect unlock code was entered. The signals causing the audible tone and fluttering LED are removed after a predetermined time (e.g. five seconds). Microprocessor 101 then applies a steady logic level 1 signal to LED 201 causing it to provide a steady visual indication that the signaling circuit is still locked.

In order to change the unlock code, the station lock pushbutton is depressed and held, causing switch 301 to close and connect lead 302 to ground. Microprocessor 101 detects the resultant continuous logic level 0 signal on lead 302. This signal must be continuous for some predetermined duration, e.g. 1.5 seconds, in order to distinguish it from the momentary switch signals associated with locking and unlocking the signaling circuit. Microprocessor 101 then causes LED 201 to light continuously, and transducer 203 to provide a tone for a predetermined time (e.g. 300 milliseconds). These tones and light signals indicate that the microprocessor is ready to receive data to change the unlock code.

When the station lock pushbutton is subsequently released, switch 301 disconnects lead 302 from ground. Microprocessor 101 detects the resultant logic level 1 signal and causes LED 201 to flash. Data is then provided to microprocessor 101, via keypad 800, in the form of the current unlock code followed by entering the new unlock code twice. When the station lock pushbutton is subsequently depressed and held, microprocessor 101 detects the resultant logic level 0 signal on lead 302. It then causes transducer 203 to provide a tone for a predetermined time (e.g. 300 milliseconds) and it causes LED 201 to light continuously. These visual and audible signals indicate that valid current and new unlock codes have been received. When the station lock feature button is subsequently released, microprocessor 101 detects the resultant logic level 1 signal on lead 302. It then stores the new unlock code in memory 102 and causes LED 201 to be extinguished.

Thus the telephone station signaling lock circuit of the present invention uses a microprocessor and an associated memory to lock the signaling circuit in response to operation of a station lock pushbutton. This invention also allows the signaling circuit to be unlocked in response to operation of the station lock pushbutton and receipt of a predetermined unlock code via the keypad. This invention further allows the unlock code to be changed in response to operation of the station lock pushbutton and receipt of the current and new unlock codes via the keypad.

It will be obvious to those skilled in the art that numerous modifications of the present invention can be made without departing from the spirit of the invention which shall be limited only by the scope of the claims appended hereto.

What is claimed is:

1. A telephone station signaling lock circuit for use in a telephone station including a keypad being operative to provide more than one plurality of pairs of row and column signals, and a tone generator being operative to provide a plurality of pairs of tones, said signaling lock circuit comprising:
    a station lock switch being operative to provide a switch signal;
    storage means being operative to provide a stored lock status signal, a stored unlock status signal and a stored unlock code signal, each in response to a lock status signal, unlock status signal or unlock code signal, respectively, being stored in said storage means;
    a microprocessor connected between said station lock switch and said storage means and being operative in response to said switch signal to retrieve said stored lock status signal or said stored unlock status signal, and said microprocessor being operative in response to said stored unlock status signal to provide disable and first sensible control signals and to store a lock status signal in said storage means;
    said microprocessor being further operative in response to said switch signal, said stored lock status signal and a first plurality of pairs of row and column signals representative of said stored unlock code signal, to provide enable and second sensible control signals, and to store an unlock status signal in said storage means;
    gating means coupled between said microprocessor and said tone generator and further coupled between said keypad and said tone generator, and being operative in response to said enable signal and said pairs of row and column signals to provide signals representative of said pairs of row and column signals, and being further operative in response to said disable signal to inhibit said signals representative of said row and column signals;
    said tone generator being operative in response to said signals representative of said pairs of row and column signals to provide an associated pair of tones; and
    first sensible indication means connected to said microprocessor and being operative in response to said first sensible control signal to provide a first sensible signal, and being further operative in response to said second sensible control signal to provide a second sensible signal.

2. A station signaling lock circuit as claimed in claim 1, wherein: said microprocessor is operative in response to said switch signal of a predetermined duration, said first plurality of pairs of row and column signals representative of said stored unlock code signal, a second plurality of pairs of row and column signals to store an unlock code signal, representative of said second plurality of pairs of row and column signals in said storage means.

3. A station signaling lock circuit as claimed in claim 1, wherein: said microprocessor is further operative in response to said switch signal and said stored lock status signal to periodically provide said first sensible control signal at a first predetermined frequency, whereby said first sensible indicating means provides a corresponding periodic first sensible signal; said first plurality of pairs of row and column signals being provided in response to said periodic first sensible signal.

4. A station signaling lock circuit as claimed in claim 2, wherein: said microprocessor is further operative in response to a first plurality of pairs of row and column signals which is not representative of said stored unlock code signal to periodically provide said first sensible control signal at a second predetermined frequency for a first predetermined duration, whereby said first sensible indicating means provides a corresponding periodic first sensible signal at said second predetermined frequency and for said first predetermined duration.

5. A station signaling lock circuit as claimed in claim 1, wherein there is further included:
    second sensible indicating means connected to said microprocessor;
    said microprocessor being further operative in response to said first plurality of pairs of row and column signals which is not representative of said stored unlock code signal to provide a third sensible control signal for a predetermined duration; and
    said second sensible indicating means being operative in response to said third sensible control signal of said predetermined duration to provide a third sensible signal of a predetermined duration.

6. A telephone station signaling lock circuit as claimed in claim 1, wherein said keypad includes a plurality of row outputs and a plurality of column outputs, each associated with a different one of said row or column signals, said gating means comprising:

a plurality of AND gates each having a first input coupled to said microprocessor and a second input coupled to an associated one of said row or column outputs.

7. A telephone station signaling circuit as claimed in claim 1, wherein there is further included:
a transistor connected between said microprocessor and said gating means; said transistor being operative in response to said enable and disable signals to provide first and second control signals, respectively, said gating means being operative in response to said first control signal and said row and column signals to apply said signals representative of said row and column signals to said tone generator, and further operative in response to said second control signal to inhibit said signals representative of said row and column signals.

8. A telephone station signaling lock circuit as claimed in claim 6, wherein said gating means further comprises:
a plurality of inverters, each coupled between a keypad output and said second input of an associated one of said AND gates, said inverters being operative in response to said row and column signals to provide inverted row and column signals, and said plurality of AND gates being operative in response to said enable signal and said inverted row and column signals to apply said signals representative of said row and column signals to said tone generator, and further operative in response to said disable signal to inhibit said signals representative of said row and column signals.

9. A telephone station signaling lock circuit as claimed in claim 1, wherein there is further included: a plurality of protection diodes each connected between an associated keypad output and said microprocessor and each further connected between said associated keypad output and said gating means.

10. A telephone station signaling lock circuit as claimed in claim 1, wherein: said storage means comprises a memory.

11. A telephone station signaling lock circuit as claimed in claim 1, wherein: said first sensible indicating means comprises visual indicating means.

12. A telephone station signaling lock circuit as claimed in claim 5, wherein: said second sensible indicating means comprises an audible indicating means.

* * * * *